US012304071B2

(12) United States Patent
Oda et al.

(10) Patent No.: US 12,304,071 B2
(45) Date of Patent: May 20, 2025

(54) ROBOT CONTROL SYSTEM, ROBOT CONTROL METHOD, AND CONTROL PROGRAM

(71) Applicant: TOYOTA JIDOSHA KABUSHIKI KAISHA, Toyota (JP)

(72) Inventors: Shiro Oda, Anjo (JP); Tetsuya Taira, Nagakute (JP); Satoshi Toyoshima, Okazaki (JP); Yuta Watanabe, Toyota (JP); Takeshi Matsui, Nisshin (JP); Takayoshi Nasu, Okazaki (JP); Kei Yoshikawa, Nagoya (JP); Yusuke Ota, Nagakute (JP); Yutaro Ishida, Toyota (JP); Yuji Onuma, Nagoya (JP); Kyosuke Arai, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 313 days.

(21) Appl. No.: 17/696,331

(22) Filed: Mar. 16, 2022

(65) Prior Publication Data
US 2022/0339779 A1 Oct. 27, 2022

(30) Foreign Application Priority Data

Apr. 21, 2021 (JP) ................................ 2021-071591

(51) Int. Cl.
*B25J 9/00* (2006.01)
*B25J 9/16* (2006.01)

(52) U.S. Cl.
CPC ............ *B25J 9/0084* (2013.01); *B25J 9/162* (2013.01); *B25J 9/1674* (2013.01); *B25J 9/1679* (2013.01)

(58) Field of Classification Search
CPC ........ B25J 9/0084; B25J 9/162; B25J 9/1674; B25J 9/1679; B25J 13/006; G05B 2219/40411; G05D 1/0297
See application file for complete search history.

(56) References Cited

U.S. PATENT DOCUMENTS

| 7,092,803 B2 * | 8/2006 | Kapolka | ................. G06Q 10/08 701/32.4 |
| 11,602,841 B2 * | 3/2023 | Griffin | .................. A47L 9/2852 |

(Continued)

FOREIGN PATENT DOCUMENTS

| CN | 106066647 A | 11/2016 | |
| CN | 109698862 A * | 4/2019 | ........... H04L 67/025 |

(Continued)

OTHER PUBLICATIONS

CN109698862A_VehicleDiagnosisMethodManagementServerAnd DiagnosisServer (Year: 2019).*

(Continued)

*Primary Examiner* — Ramon A. Mercado
*Assistant Examiner* — Shaheda Hoque
(74) *Attorney, Agent, or Firm* — Sughrue Mion, PLLC

(57) ABSTRACT

A robot control system according to the present embodiment includes a plurality of mobile robots that moves autonomously in a facility and a control device that controls the mobile robots. When the control device detects that two or more of the mobile robots are in a recovery requiring state, the control device notifies that the two or more mobile robots are in the recovery requiring state, together with priorities of the two or more mobile robots.

10 Claims, 6 Drawing Sheets

(56) References Cited

U.S. PATENT DOCUMENTS

| | | | |
|---|---|---|---|
| 2012/0191246 A1* | 7/2012 | Roe | B25J 9/0003 700/259 |
| 2013/0085625 A1* | 4/2013 | Wolfe | G05B 23/0272 701/1 |
| 2019/0176323 A1* | 6/2019 | Coady | B65G 1/0421 |
| 2019/0384307 A1 | 12/2019 | Honda et al. | |
| 2023/0107387 A1 | 4/2023 | Watanabe et al. | |

FOREIGN PATENT DOCUMENTS

| | | | | |
|---|---|---|---|---|
| CN | 110609543 A | | 12/2019 | |
| EP | 3567695 A1 | * | 11/2019 | B25J 19/005 |
| JP | 3541510 B2 | * | 7/2004 | |
| JP | 4329667 B2 | | 9/2009 | |
| JP | 4919839 B2 | * | 4/2012 | |
| JP | 5807990 B2 | | 11/2015 | |
| JP | 5984986 B1 | * | 9/2016 | |
| JP | 2017045257 A | * | 3/2017 | B25J 9/1674 |
| JP | 2019054409 A | * | 4/2019 | B25J 11/008 |
| JP | 2019-525273 A | | 9/2019 | |
| JP | 6880552 B2 | * | 6/2021 | |
| JP | 2021-131599 A | | 9/2021 | |
| JP | 2021174460 A | * | 11/2021 | |
| WO | 2013/044069 A1 | | 3/2013 | |
| WO | 2017/218234 A1 | | 12/2017 | |
| WO | WO-2020125591 A1 | * | 6/2020 | H04L 67/025 |

OTHER PUBLICATIONS

CN109698862A_Vehicle DiagnosisMethodManagementServerAnd DiagnosisServer_Images (Year: 2019).*
JP2021174460AMobileRobotControlSystemAndMobileRobot (Year: 2021).*
JP2021174460AMobileRobotControlSystemAndMobileRobot_Drawings (Year: 2021).*
JP4919839B2_RemoteMonitoringSystem (Year: 2012).*
JP4919839B2_RemoteMonitoringSystem_Drawings (Year: 2012).*

* cited by examiner

ROBOT CONTROL SYSTEM, ROBOT CONTROL METHOD, AND CONTROL PROGRAM

CROSS-REFERENCE TO RELATED APPLICATION

This application claims priority to Japanese Patent Application No. 2021-071591 filed on Apr. 21, 2021, incorporated herein by reference in its entirety.

BACKGROUND

1. Technical Field

The present disclosure relates to a robot control system, a robot control method, and a control program.

2. Description of Related Art

Japanese Patent No. 5807990 (JP 5807990 B) discloses a system for managing actions of a plurality of mobile robots.

SUMMARY

In the system disclosed in JP 5807990 B, there is a possibility that, when the mobile robots break down and are placed in a state in which the mobile robots require recovery (hereinafter referred to as a "recovery requiring state"), recovery of the mobile robot requiring urgent recovery may be delayed because a recovery priority is not determined.

The present disclosure has been made in view of the above background, and it is an object of the present disclosure to provide a robot control system, a robot control method, and a control program capable of preferentially start a recovery operation of a mobile robot having a highest recovery priority from among the mobile robots in the recovery requiring state.

A robot control system according to the present embodiment is a robot control system that controls a plurality of mobile robots that moves autonomously in a facility. When the robot control system detects that two or more of the mobile robots are in a recovery requiring state, the robot control system notifies that the two or more mobile robots are in the recovery requiring state, together with priorities of the two or more mobile robots. The robot control system notifies that the mobile robots in the recovery requiring state are in the recovery requiring state, and also notifies recovery priorities of the mobile robots in the recovery requiring state. Therefore, a related person of the facility, for example, can preferentially start a recovery operation from the mobile robot having a high recovery priority.

The robot control system may determine a recovery priority of each of the two or more mobile robots based on at least any of a transported object, a purpose of movement, and a current position of each of the two or more mobile robots.

The robot control system may notify that each of the two or more mobile robots is in the recovery requiring state, together with a recovery priority of each of the two or more mobile robots, via a communication device provided in the facility.

The robot control system may notify that each of the two or more mobile robots is in the recovery requiring state, together with a recovery priority of each of the two or more mobile robots, via a mobile terminal possessed by a related person of the facility.

The robot control system may notify that each of the two or more mobile robots is in the recovery requiring state, together with a recovery priority of each of the two or more mobile robots, via a communication device provided in each of the two or more mobile robots.

The robot control system may notify that the mobile robot having a highest recovery priority, from the two or more mobile robots, is in the recovery requiring state via a communication device provided in the mobile robot having the highest recovery priority.

The robot control system may notify that the mobile robot having a second highest recovery priority, from the two or more mobile robots, is in the recovery requiring state via the communication device provided in the mobile robot having the highest recovery priority.

The robot control system may further notify at least any of a transported object, a purpose of movement, and a current position of each of the two or more mobile robots.

The robot control system may include a plurality of mobile robots that moves autonomously in a facility; and a control device that controls the mobile robots. When the control device detects that the two or more of the mobile robots are in the recovery requiring state, the control device may notify that the two or more mobile robots are in the recovery requiring state, together with the priorities of the two or more mobile robots.

A robot control method according to the present embodiment includes: a step of detecting an operating state of each of a plurality of mobile robots that moves autonomously in a facility; and a step of notifying that, when two or more of the mobile robots are detected to be in a recovery requiring state, the two or more mobile robots are in the recovery requiring state, together with priorities of the two or more mobile robots. The robot control method notifies that the mobile robots in the recovery requiring state are in the recovery requiring state, and also notifies recovery priorities of the mobile robots in the recovery requiring state. Therefore, the related person of the facility, for example, can preferentially start the recovery operation from the mobile robot having a high recovery priority.

A control program according to the present embodiment causes a computer to execute: a process of detecting an operating state of each of a plurality of mobile robots that moves autonomously in a facility; and a process of notifying that, when two or more of the mobile robots are detected to be in a recovery requiring state, the two or more mobile robots are in the recovery requiring state, together with priorities of the two or more mobile robots. The control program notifies that the mobile robots in the recovery requiring state are in the recovery requiring state, and also notifies recovery priorities of the mobile robots in the recovery requiring state. Therefore, the related person of the facility, for example, can preferentially start the recovery operation from the mobile robot having a high recovery priority.

The present disclosure can provide a robot control system, a robot control method, and a control program capable of preferentially start a recovery operation of a mobile robot having a high recovery priority from among the mobile robots in the recovery requiring state.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

Hereinafter, the present disclosure will be described through embodiments of the disclosure. However, the disclosure according to the claims is not limited to the following embodiments. Moreover, all of the configurations described in the embodiments are not necessarily indispensable as means for solving the issue. In order to clarify the explanation, the following description and drawings have been omitted or simplified as appropriate. In each drawing, the same elements are designated by the same reference signs, and duplicate explanations are omitted as necessary.

First Embodiment

Hereinafter, a robot control system according to a first embodiment will be described.

The robot control system according to the present embodiment is a system that controls a plurality of mobile robots configured to be autonomously movable in a predetermined facility. The robot control system may be only a server device (control device) that controls the mobile robots, or may include the mobile robots in addition to the server device. In the present embodiment, a case where the robot control system includes the server device and the mobile robots will be described. The mobile robot includes a transfer robot that autonomously moves to transport an article.

Figure 1:
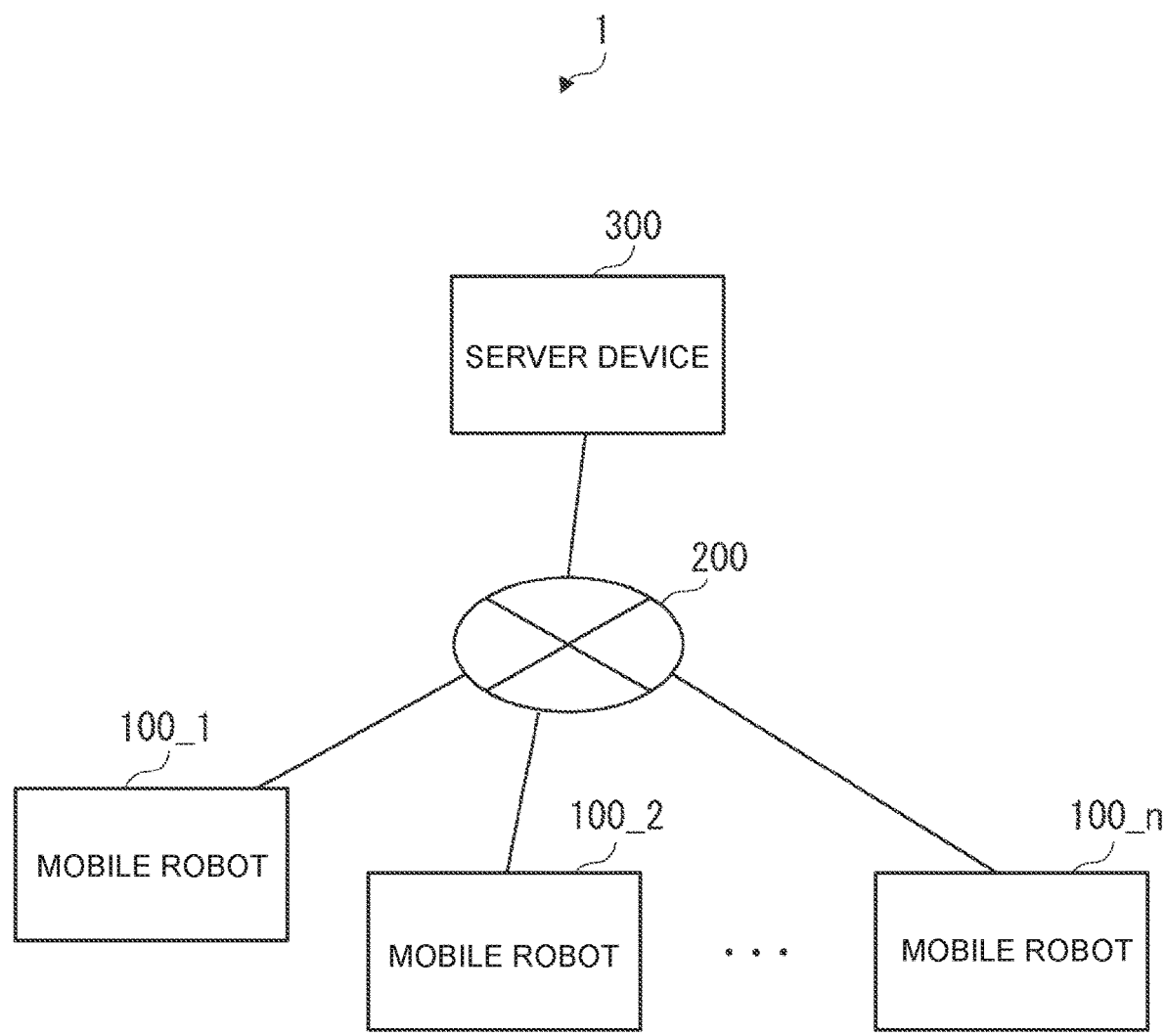
FIG. 1 is a block diagram showing a configuration example of a robot control system according to a first embodiment.

FIG. 1 is a block diagram showing a configuration example of a robot control system 1 according to the first embodiment. As shown in FIG. 1, the robot control system 1 includes a server device 300, n (n is an integer of 2 or more) mobile robots 100, and a network 200. In the following description, the n mobile robots 100 may be referred to as mobile robots 100_1 to 100_n in order to distinguish the mobile robots from each other. The server device 300 and the mobile robots 100_1 to 100_n are configured to be communicable with each other via the wired or wireless network 200. Further, the mobile robots 100_1 to 100_n are also configured to be communicable with each other via the network 200.

The mobile robots 100_1 to 100_n are each configured to be autonomously movable in a predetermined facility such as a hospital. However, the predetermined facility is not limited to a hospital. The predetermined facility may be a hotel, a shopping mall, or the like as long as each of the mobile robots 100_1 to 100_n can move autonomously. In the present embodiment, a case where the predetermined facility is a hospital will be described as an example.

The server device 300 controls a part of or all of the operations of each of the mobile robots 100_1 to 100_n. For example, the server device 300 receives information such as position information, traveling information, transported objects, and remaining battery level from each of the mobile robots 100_1 to 100_n, and transmits a traveling route to a destination and information such as obstacles on the traveling route to each of the mobile robots 100_1 to 100_n.

Here, when the server device 300 detects that any of the mobile robots 100_1 to 100_n is in the recovery requiring state, the server device 300 notifies that the mobile robot in the recovery requiring state is in the recovery requiring state. With this configuration, for example, a related person of a facility (for example, medical staff) and the like can quickly start a recovery operation of the mobile robot in the recovery requiring state. As a result, the mobile robot in the recovery requiring state can be quickly recovered.

Further, when the server device 300 detects that two or more mobile robots among the mobile robots 100_1 to 100_n are in the recovery requiring state, the server device 300 notifies that the two or more mobile robots are in the recovery requiring state, together with their priorities. With this configuration, for example, the related person of the facility (for example, medical staff) and the like can preferentially start a recovery operation of the mobile robot having the highest recovery priority. As a result, it is possible to preferentially start a recovery operation of the mobile robot having the high recovery priority.

Subsequently, the details of each component of the robot control system 1 will be described.

Specific Example of Server Device 300

First, a specific example of the server device 300 will be described. The server device 300 is, for example, a computer having a communication function. The server device 300 is not limited to the case where the server device 300 is installed in the predetermined facility, and may be installed at any place as long as the server device 300 can communicate with the mobile robots 100_1 to 100_n.

Figure 2:
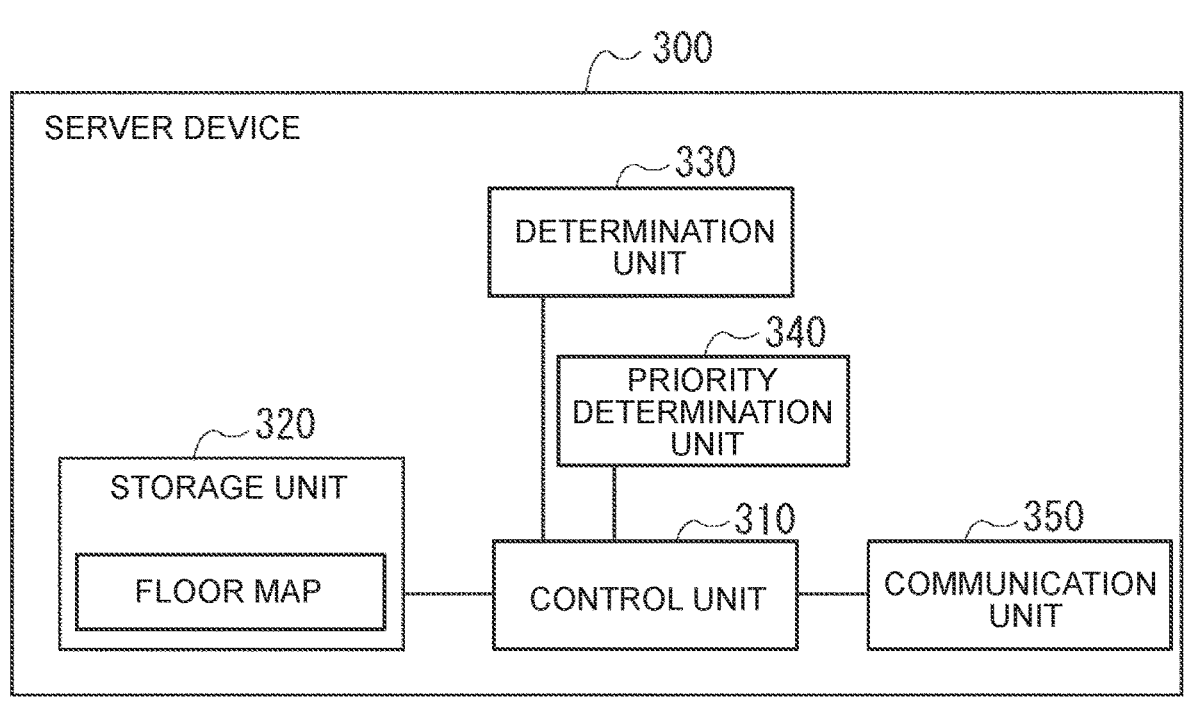
FIG. 2 is a block diagram showing a configuration example of a server device provided in the robot control system shown in FIG. 1.

FIG. 2 is a block diagram showing a configuration example of the server device 300. As shown in FIG. 2, the server device 300 includes a control unit 310, a storage unit 320, a determination unit 330, a priority determination unit 340, and a communication unit 350.

The communication unit 350 communicates with each of the mobile robots 100_1 to 100_n. The communication unit 350 outputs a signal received from each of the mobile robots 100_1 to 100_n to the control unit 310. Further, the communication unit 350 transmits a signal output from the control unit 310 to at least any of the mobile robots 100_1 to 100_n as necessary. Note that, the communication unit 350 may include a router device for performing communication between the server device 300 and each of the mobile robots 100_1 to 100_n. Further, the communication unit 350 may have different communication means for each component of the mobile robot as a communication target so as to perform communication between the server device 300 and each of the mobile robots 100_1 to 100_n.

The control unit 310 includes an arithmetic unit such as a central processing unit (CPU) and executes various information processes. For example, the control unit 310 instructs the mobile robots 100_1 to 100_n to move to the destination along the designated traveling route, instructs the mobile robots 100_1 to 100_n to transport a predetermined transported object, instructs the mobile robots 100_1 to 100_n to bypass an obstacle, and instructs the mobile robots 100_1 to 100_n to stop in a predetermined area.

The storage unit 320 includes a non-volatile memory such as a flash memory or a solid state drive (SSD). The storage unit 320 stores, for example, a floor map of a predetermined facility in which the mobile robots 100_1 to 100_n are provided. The storage unit 320 is connected to the control unit 310. From the information stored in the storage unit 320, the information corresponding to a request from the control unit 310 is read out from a storage area of the storage unit 320.

The determination unit 330 determines whether each of the mobile robots 100_1 to 100_n is in the recovery requiring state. For example, when the determination unit 330 receives a notification from the mobile robot 100_i (i is an arbitrary integer of 1 to n) that the mobile robot_i is in the recovery requiring state via the communication unit 350, the determination unit 330 determines that the mobile robot 100_i is in the recovery requiring state. Alternatively, the determination unit 330 monitors operating states of the mobile robots 100_1 to 100_n, and determines whether each of the mobile robots 100_1 to 100_n is in the recovery requiring state based on the monitoring results. For example, when the determination unit 330 detects that the mobile robot 100_i has stopped in a predetermined emergency evacuation area, or when the determination unit 330 detects that the mobile robot 100_i that should be moving has not moved for a predetermined period or more, the determination unit 330 determines that the mobile robot 100_i is in the recovery requiring state. The determination unit 330 may determine whether each of the mobile robots 100_1 to 100_n is in the recovery requiring state using an arbitrary method other than the above method.

When the determination unit 330 determines that any of the mobile robots 100_1 to 100_n is in the recovery requiring state, the control unit 310 notifies that the mobile robot is in the recovery requiring state. For example, when the determination unit 330 determines that the mobile robot 100_i is in the recovery requiring state, the control unit 310 transmits information indicating that the mobile robot 100_i is in the recovery requiring state to a speaker or a monitor that is a notification device provided in the facility via the communication unit 350. With this process, the speaker provided in the facility outputs a voice information indicating that the mobile robot 100_i is in the recovery requiring state. Further, the monitor provided in the facility makes a display indicating that the mobile robot 100_i is in the recovery requiring state. With this process, the related person of the facility (for example, medical staff) and the like can understand that the mobile robot 100_i is in the recovery requiring state, and thus can quickly start the recovery operation of the mobile robot 100_i in the recovery requiring state. As a result, the mobile robot 100_i in the recovery requiring state can be quickly recovered.

Note that, the control unit 310 is not limited to the case where the control unit 310 notifies that the mobile robot 100_i is in the recovery requiring state via the speaker or the monitor provided in the facility, and may notify that via a speaker or a monitor mounted on each of the mobile robots 100_1 to 100_n, for example. Alternatively, the control unit 310 may notify that the mobile robot 100_i is in the recovery requiring state via the speaker or the monitor mounted on the mobile robot 100_i rather than the speakers or the monitors of all the mobile robots 100_1 to 100_n.

Further, the control unit 310 may notify that the mobile robot 100_i is in the recovery requiring state via a mobile terminal possessed by the related person of the facility or the like. A mobile terminal is, for example, a portable wireless communication terminal such as a smartphone or tablet that is owned by an individual or assigned exclusively.

When the determination unit 330 determines that two or more of the mobile robots 100_1 to 100_n are in the recovery requiring state, the priority determination unit 340 determines recovery priorities of the mobile robots in the recovery requiring state. For example, when the determination unit 330 determines that the mobile robots 100_i, 100_j (j is an arbitrary integer other than i among 1 to n) are in the recovery requiring state, the priority determination unit 340 determines the recovery priorities of the mobile robot 100_i, 100_j based on the transported object, a purpose of movement, the position information and the like of each of the mobile robots 100_i, 100_j.

For example, a relatively high recovery priority is set to a mobile robot that is transporting a stretcher carrying a patient, an organ for transplantation, a drug, blood for transfusion, and the like. On the other hand, a relatively low recovery priority is set to a mobile robot that is transporting regularly used medicines, hospital foods provided to inpatients, medical engineering (ME) instruments, and the like. In addition, setting of the recovery priority is not limited to the above-mentioned transported objects, and may be set to any kind of transported objects.

Also, for example, a higher recovery priority is set to the mobile robot that is moving to the operating room to support emergency surgery, compared with the mobile robot that is moving to a charging station for charging. Alternatively, for example, a higher recovery priority is set to the mobile robot that is stopped in an elevator or at a place where there is a lot of traffic, compared with the mobile robot that is stopped at a place where there is little traffic. Note that, the purpose of movement is not limited to the above, and any recovery priority may be set to any purpose of movement. The stop position is not limited to the above, and any recovery priority may be set to any stop position.

Here, when the determination unit 330 determines that two or more of the mobile robots 100_1 to 100_n are in the recovery requiring state, the control unit 310 notifies that the two or more mobile robots are in the recovery requiring state, together with their priorities. For example, when the determination unit 330 determines that the mobile robots 100_i, 100_j are in the recovery requiring state, the control unit 310 transmits information indicating that the mobile robots 100_i, 100_j are in the recovery requiring state to the speaker or the monitor provided in the facility via the communication unit 350, together with their priorities. With this process, the speaker provided in the facility outputs a voice information indicating that the mobile robots 100_i, 100_j are in the recovery requiring state, together with their priorities. Further, the monitor provided in the facility makes a display indicating that the mobile robots 100_i, 100_j are in the recovery requiring state, together with their priorities. With this configuration, for example, the related person of the facility (for example, medical staff) and the like can preferentially start a recovery operation of the mobile robot having the higher recovery priority from the mobile robots 100_i, 100_j. As a result, it is possible to preferentially start a recovery operation of the mobile robot having the high recovery priority.

Note that, the control unit 310 may notify that the mobile robots 100_i, 100_j are in the recovery requiring state via the speaker or the monitor mounted on each of the mobile robots 100_1 to 100_n, together with their priorities. Alternatively, the control unit 310 may notify that the mobile robots 100_i, 100_j are in the recovery requiring state only via the speakers or the monitors mounted on the mobile robots 100_i, 100_j, together with their priority.

Alternatively, the control unit 310 may notify that, from the mobile robot having the highest recovery priority, the mobile robot is in the recovery requiring state. At this time, the recovery priority of the mobile robot notified as being in the recovery requiring state is the highest at the time of notification. Therefore, it can be said that the control unit 310 also notifies the recovery priority. For example, the control unit 310 may first notify that the mobile robot 100_i having the highest recovery priority is in the recovery requiring state via the speaker or the monitor mounted on the mobile robot 100_i, and may notify that the mobile robot 100_j having the second highest recovery priority is in the recovery requiring state via the speaker or the monitor mounted on the mobile robot 100_j after the mobile robot 100_i is recovered. Note that, when the control unit 310 notifies that the mobile robot 100_i having the highest recovery priority is in the recovery requiring state via the speaker or the monitor mounted on the mobile robot 100_i, the control unit 310 may further notify that the mobile robot 100_j having the second highest recovery priority is in the recovery requiring state, the current position of the mobile robot 100_j and the like.

Further, the control unit 310 may further notify at least any of the transported object, the purpose of movement, and the current position of each of the mobile robots 100_i, 100_j when the control unit 310 notifies that the mobile robots 100_i, 100_j are in the recovery requiring state, in addition to their priorities.

Further, the control unit 310 may notify that the mobile robot 100_i is in the recovery requiring state, together with its priority, via a mobile terminal possessed by the related person of the facility or the like. A mobile terminal is, for example, a portable wireless communication terminal such as a smartphone or tablet that is owned by an individual or assigned exclusively.

Figure 3:
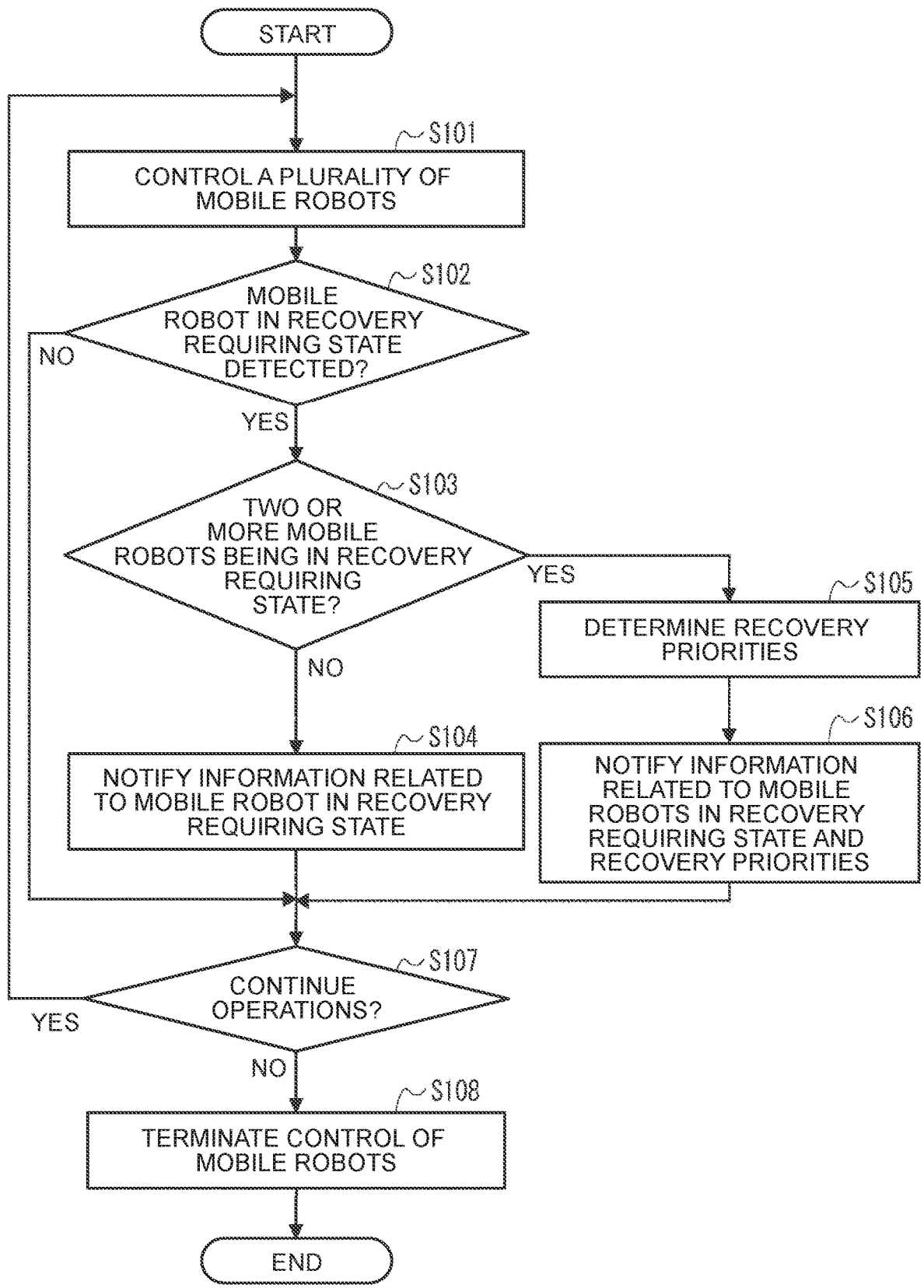
FIG. 3 is a flowchart showing an example of an operation of the server device shown in FIG. 2.

Subsequently, the operation of the server device 300 will be described with reference to FIG. 3. FIG. 3 is a flowchart showing an example of the operation of the server device 300.

First, the server device 300 starts control of a part or all of the operations of each of the mobile robots 100_1 to 100_n provided in the predetermined facility (step S101). With this step, the mobile robots 100_1 to 100_n start respective designated operations.

Here, the server device 300 periodically monitors whether the mobile robots 100_1 to 100_n are in the recovery requiring state during the period in which the operations of the mobile robots 100_1 to 100_n are controlled (step S102).

For example, when the server device 300 detects that one mobile robot 100_i is in the recovery required state (YES in step S102→NO in step S103), the server device 300 notifies that the mobile robot 100_i is in the recovery requiring state via, for example, the speaker or the monitor provided in the facility or via the mobile robot 100_i (step S104). With this process, the related person of the facility (for example, medical staff) and the like can understand that the mobile robot 100_i is in the recovery requiring state, and thus can quickly start the recovery operation of the mobile robot 100_i in the recovery requiring state. As a result, the mobile robot 100_i in the recovery requiring state can be quickly recovered.

Further, when the server device 300 detects that two or more of the mobile robots 100_1 to 100_n are in the recovery requiring state (YES in step S102→YES in step S103), the server device 300 notifies that the two or more mobile robots are in the recovery requiring state, together with their priorities (step S106), after the server device 300 determines the recovery priorities of the two or more mobile robots (step S105).

Further, when the server device 300 detects that two mobile robots 100_i, 100_j are in the recovery requiring state (YES in step S102→YES in step S103), the server device 300 notifies that the two mobile robots 100_i, 100_j are in the recovery requiring state, together with their priorities, via the speaker or the monitor provided in the facility or via the mobile robots 100_i, 100_j (step S106) after the server device 300 determines the recovery priorities of the mobile robots 100_i, 100_j (step S105). With this configuration, for example, the related person of the facility (for example, medical staff) and the like can preferentially start a recovery operation of the mobile robot having the higher recovery priority from the mobile robots 100_i, 100_j. As a result, it is possible to preferentially start a recovery operation of the mobile robot having the high recovery priority.

Note that, when the server device 300 does not detect the mobile robot in the recovery requiring state, the server device 300 does not issue a notification (NO in step S102).

After that, when the operations are continued (YES in step S107), the server device 300 continuously controls the operations of the mobile robots 100_1 to 100_n (step S101), and when the operations are not continued (NO in step S107), the server device 300 terminates the control of the operations of the mobile robots 100_1 to 100_n (step S108).

Specific Examples of Mobile Robot 100 and Facility where Mobile Robot 100 is Provided Next, specific examples of the mobile robot 100 and the facility where the mobile robot 100 is provided will be described.

Figure 4:
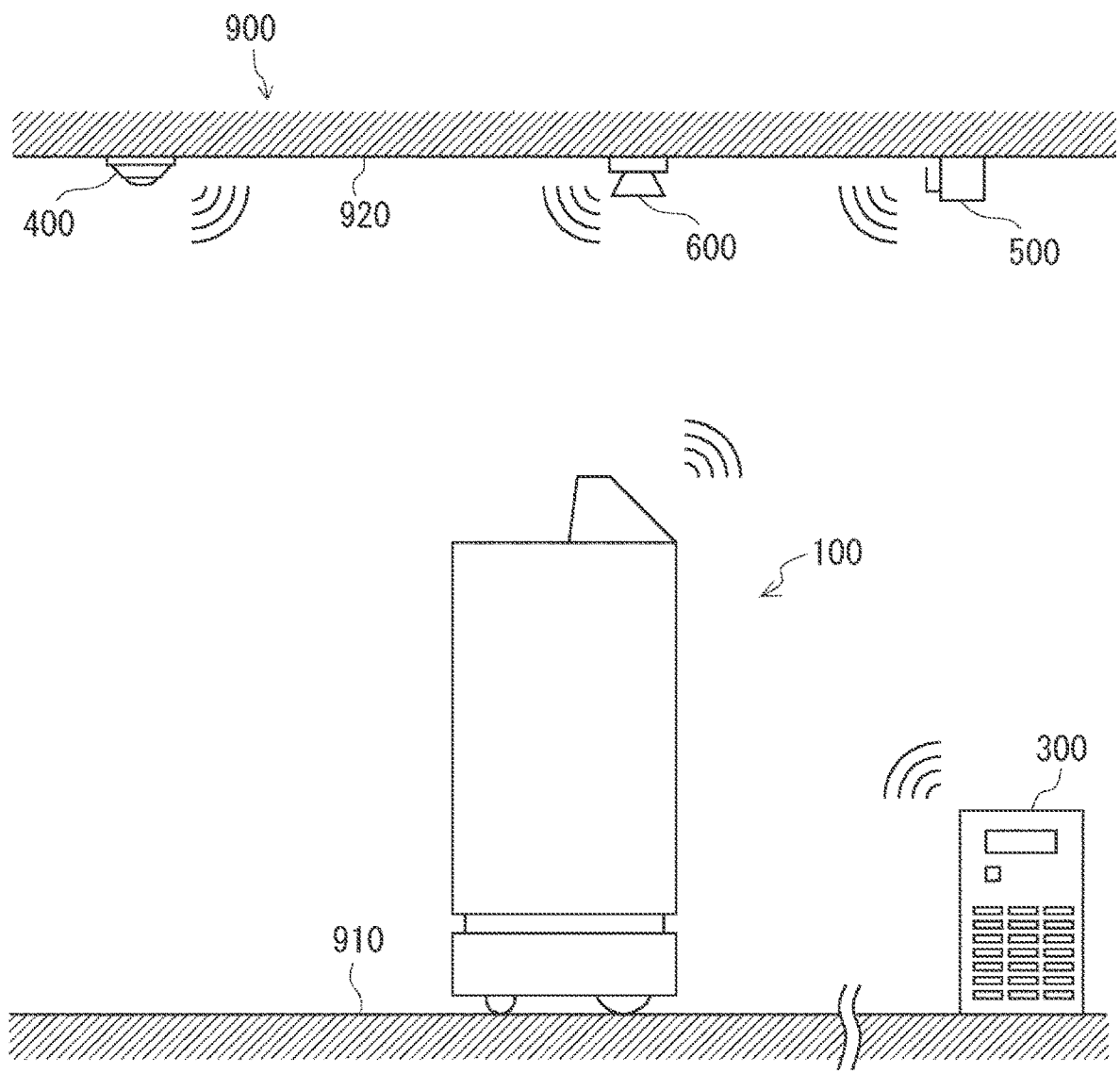
FIG. 4 is a schematic view illustrating a mobile robot provided in the robot control system shown in FIG. 1.

FIG. 4 is a schematic view illustrating the mobile robot 100. As shown in FIG. 4, the mobile robot 100 is configured to be autonomously movable in a predetermined facility 900. The predetermined facility 900 is, for example, a hospital. However, the predetermined facility 900 is not limited to a hospital but may be a hotel, a shopping mall, or the like as long as the mobile robot 100 can autonomously move. In the present embodiment, a case where the predetermined facility 900 is a hospital will be described as an example.

The mobile robot 100 autonomously moves on a floor surface 910 in the facility 900.

A facility camera 400 is installed in the facility 900. For example, the facility camera 400 is fixed to a ceiling 920 of the facility 900, and captures an image of the periphery of the facility camera 400 to generate image data. A plurality of the facility cameras 400 may be installed in the facility 900.

A speaker 600 is installed in the facility 900. For example, the speaker 600 is fixed to the ceiling 920 of the facility 900. Note that, a plurality of the speakers 600 may be installed in the facility 900. Further, in the facility 900, a monitor 700 (not shown) may be installed in addition to the speaker 600 or in place of the speaker 600. Note that, a plurality of the monitors 700 may be installed in the facility 900.

Here, the server device 300, and each of the mobile robot 100, the facility camera 400, the speaker 600, and the monitor 700 are configured to be communicable with each other via the network 200. With this configuration, the server device 300 can acquire the information acquired by the mobile robot 100 from the mobile robot 100 via the network 200. Further, the server device 300 can acquire the image data (image data) captured by the facility camera 400 from the facility camera 400 via the network 200. Further, the server device 300 can transmit the image data acquired from the facility camera 400 or an analysis result thereof to the mobile robot 100 via the network 200, or can transmit the content of the notification to the related person (for example, medical staff) of the facility 900 to the mobile robot 100, the speaker 600, the monitor 700 and the like via the network 200.

For example, the speaker 600 outputs the notification content instructed by the server device 300 by voice. Further, the monitor 700 (not shown) displays the notification content instructed by the server device 300. With this process, the related person of the facility 900 (for example, medical staff) can understand the notification content from the server device 300.

Note that, the mobile robot 100 may be configured to be communicable with the facility camera 400 or the like without the server device 300. With this configuration, for example, the mobile robot 100 can acquire data of the image (image data) captured by the facility camera 400 without the server device 300.

Further, the mobile robot 100 is configured to be communicable with another mobile robot 100 via the server device 300. However, the mobile robot 100 is not limited to this case, and may be configured to be communicable with another mobile robot 100 without the server device 300. The mobile robots 100 can transmit and receive data to and from other mobile robots 100, for example, via the server device 300 or without the server device 300.

Note that, the network 200 also includes an access point 500. The access point 500 is, for example, a wireless local area network (LAN) access point. The access point 500 is installed in the facility 900 and acquires the position information, traveling information, and the like of the mobile robot 100 from the mobile robot 100 located around the access point 500. A plurality of the access points 500 may be provided in the facility 900.

Figure 5:
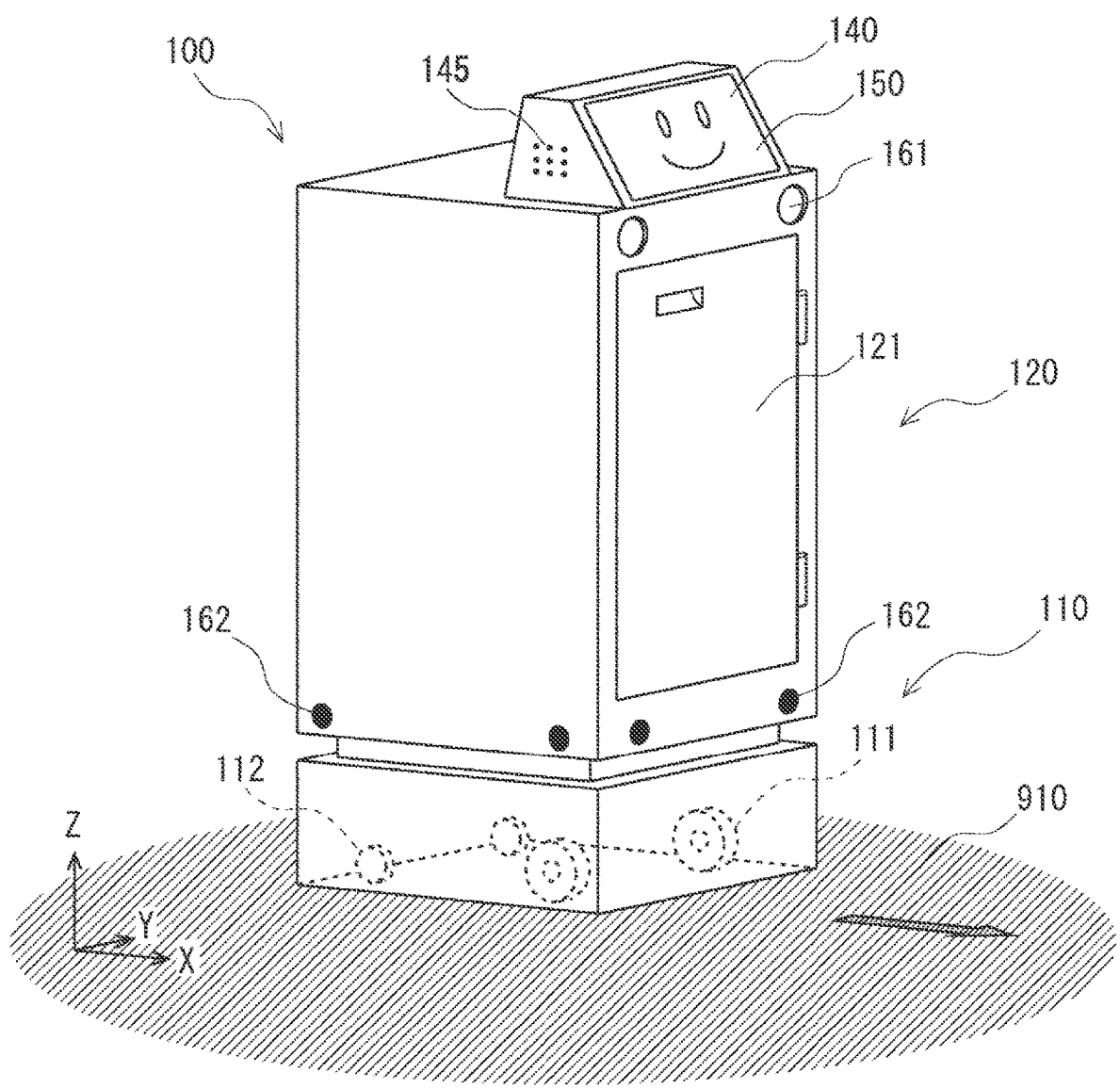
FIG. 5 is a perspective view illustrating the mobile robot provided in the robot control system shown in FIG. 1.
Figure 6:
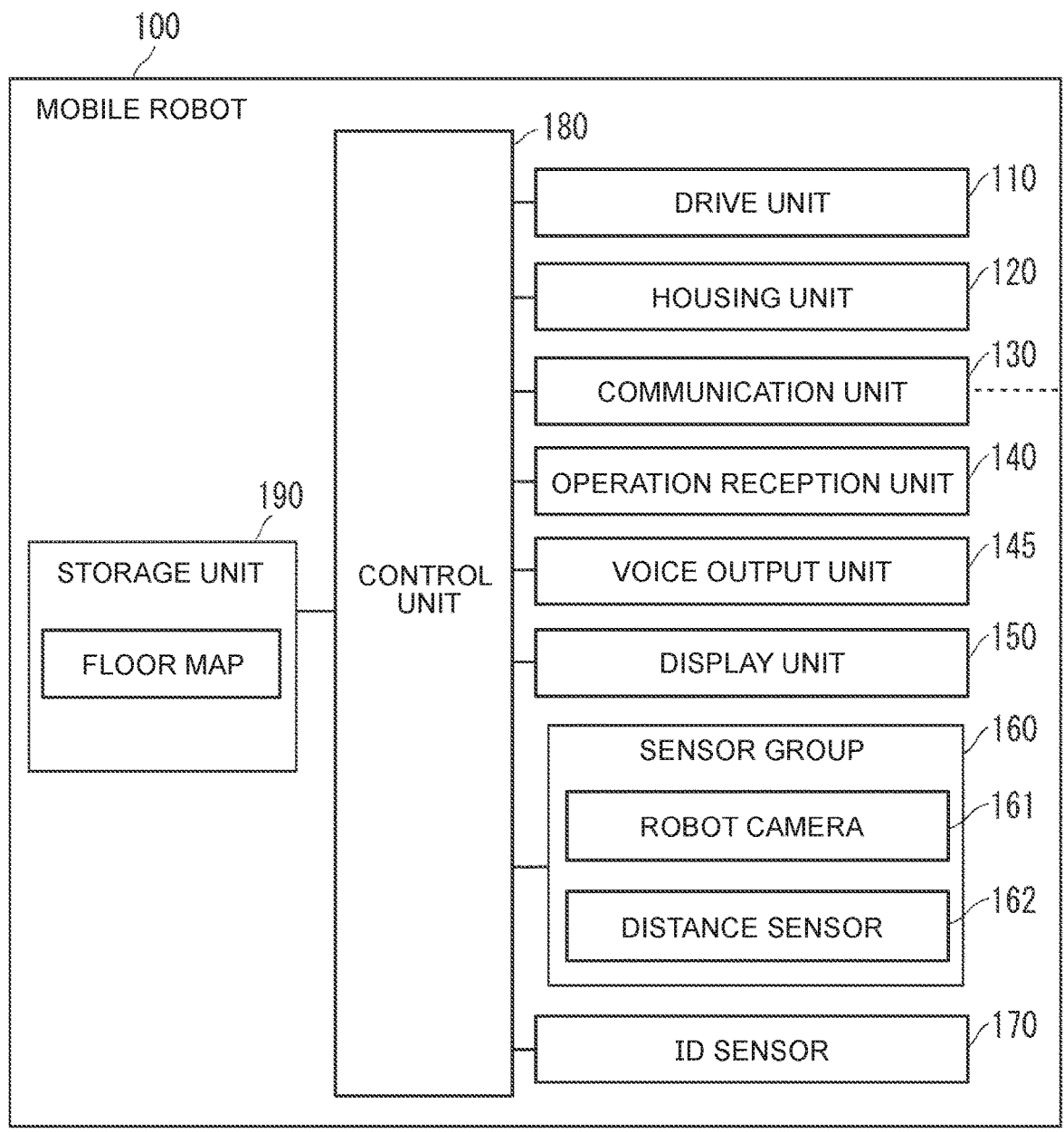
FIG. 6 is a block diagram illustrating a mobile robot provided in the robot control system shown in FIG. 1.

FIG. 5 is a perspective view illustrating the mobile robot 100. FIG. 6 is a block diagram illustrating the mobile robot 100. As shown in FIGS. 5 and 6, the mobile robot 100 includes a drive unit 110, a housing unit 120, a communication unit 130, an operation reception unit 140, a speaker 145, a monitor 150, a sensor group 160, an identification (ID) sensor 170, a control unit 180, and a storage unit 190.

As shown in FIG. 5, the mobile robot 100 is a moving body that moves on the floor surface 910 that is a movement surface. Here, for convenience of explanation of the mobile robot 100, the XYZ orthogonal coordinate axis system is used. The floor surface 910 is the XY plane, and the upper side is the +Z axis direction.

The drive unit 110 functions as means for moving the mobile robot 100. The drive unit 110 includes two drive wheels 111 in contact with the floor surface 910 and casters 112 in contact with the floor surface 910. The drive wheels 111 are set rotatable independently from each other about one rotation axis extending in a right-angle direction (a right-left direction or the Y axis direction in the drawing) with respect to a straight-ahead direction (a front-rear direction or the X axis direction in the drawing). The mobile robot 100 moves forward or rearward as the drive wheels 111 disposed on the right and left sides are caused to rotate at the same rotation speed. The mobile robot 100 turns by making a difference in the rotation speeds or in the rotation directions of the right and left drive wheels 111. The drive unit 110 drives the drive wheels 111 in response to instructions from the control unit 180.

The housing unit 120 is disposed above the drive unit 110 in the mobile robot 100. The housing unit 120 may include a storage chamber door 121. When the storage chamber door 121 is opened, a storage chamber for storing a predetermined transported object is provided inside the housing unit 120. Therefore, the mobile robot 100 can also be said to be a transfer robot that transports the predetermined article. The housing unit 120 may open and close the storage chamber door 121 in response to an instruction from the control unit 180.

As shown in FIG. 6, the communication unit 130 is an interface that is communicably connected to the outside. The communication unit 130 includes, for example, an antenna and a circuit that modulates or demodulates a signal transmitted through the antenna. The communication unit 130 receives the image data directly from the facility camera 400 or via the access point 500 and the server device 300.

Further, the communication unit 130 may receive information related to the destination, information related to whether movement is allowed, the notification content to the related person of the facility 900, and the like from the server device 300. Further, the communication unit 130 may transmit information related to the state of the mobile robot 100, position information, traveling information, and the like to the server device 300. Further, the communication unit 130 may transmit and receive the position information and the image data to and from another mobile robot 100 via the server device 300 or without the server device 300.

The communication unit 130 may periodically transmit a heartbeat signal to the server device 300. The heartbeat signal may include log data indicating the state of the mobile robot 100 in chronological order. Further, the heartbeat signal may include an ID of the mobile robot 100 and an ID of a user who operates the mobile robot 100.

The communication unit 130 is connected to the control unit 180, outputs a signal including the information transmitted from the facility camera 400 and the server device 300 to the control unit 180, and transmits the signal output from the control unit 180 to the server device 300.

The operation reception unit 140 receives an input operation from the user and transmits an operation signal to the control unit 180. As means for receiving an input operation from the user, the operation reception unit 140 may include, for example, an operation button or a touch panel superimposed on the monitor 150. The user operates the input operation means to turn on and off the power supply and to open and close the storage chamber door 121, and the like.

The speaker 145 is installed on the upper surface of the housing unit 120, for example. The speaker 145 outputs information as appropriate in accordance with the instruction from the control unit 180. For example, the speaker 145 outputs the notification content from the server device 300 by voice.

The monitor 150 is provided so as to project from the upper surface of the housing unit 120, for example. The monitor 150 includes, for example, a rectangular liquid crystal panel. The monitor 150 appropriately displays information in response to the instruction from the control unit 180. For example, the monitor 150 displays the notification content from the server device 300. A touch panel that accepts operations from the user may be superimposed on the monitor 150.

The sensor group 160 includes a sensor that acquires data necessary for the mobile robot 100 to move autonomously. The sensor group 160 includes, for example, a robot camera 161 and a distance sensor 162. The sensor group 160 may include sensors other than the robot camera 161 and the distance sensor 162.

The robot camera 161 is disposed above the housing unit 120 and below the monitor 150, for example. As the robot camera 161, two camera units having the same angle of view may be disposed horizontally separated from each other. The image captured by each camera unit is output to the control unit 180 as the image data.

The distance sensor 162 is disposed, for example, in the lower portion of the housing unit 120. The distance sensor 162 may be disposed on the lower portion of each of the +X-axis direction side surface, the −X-axis direction side surface, the +Y-axis direction side surface, and the −Y-axis direction side surface of the housing unit 120. The distance sensor 162 measures the distance of the object around the mobile robot 100. The control unit 180 recognizes an obstacle around the mobile robot 100 by analyzing the image data output from the robot camera 161 and the detection signal output from the distance sensor 162, and measures the distance between the mobile robot 100 and the obstacle.

The ID sensor 170 is provided, for example, in the vicinity of the monitor 150. The ID sensor 170 identifies the ID of the user who operates the mobile robot 100, and detects a unique identifier included in an ID card owned by each user. The ID sensor 170 includes, for example, an antenna for reading information on a wireless tag. The user causes the mobile robot 100 to recognize the ID of the user who is the operator by bringing the ID card close to the ID sensor 170.

The control unit 180 is an information processing device having an arithmetic unit such as a CPU. The control unit 180 includes the hardware included in the control unit 180 and the program stored in the hardware. That is, the process executed by the control unit 180 is realized by either hardware or software.

The control unit 180 acquires various types of information from each configuration and issues an instruction to each configuration in accordance with the acquired information.

For example, the control unit 180 detects the distance between the mobile robot 100 and the surrounding object based on the image data acquired from the facility camera 400 and the robot camera 161, the information on the object around the mobile robot 100 acquired from the distance sensor 162, and the like. Then, the control unit 180 calculates the route to the destination based on the detected distance, position information, and the like. Then, the control unit 180 instructs the drive unit 110 to move along the calculated route. When executing such a process, the control unit 180 refers to the information related to the floor map stored in the storage unit 190.

Further, when the mobile robot 100 breaks down and is placed in the recovery requiring state, the control unit 180 may instruct the communication unit 130 to transmit the information indicating that the mobile robot 100 is in the recovery requiring state and information for determining the recovery priority (the transported object, the position information, the purpose of movement, etc.) to the server device 300. Upon receipt of the instruction above from the control unit 180, the communication unit 130 transmits information indicating that the mobile robot 100 is in the recovery requiring state and the information for determining the recovery priority (the transported object, the position information, the purpose of movement, etc.) to the server device 300. With this process, the server device 300 can recognize that the mobile robot 100 is placed in the recovery requiring state.

As described above, the server device 300 itself may determine whether the mobile robot 100 is placed in the recovery requiring state based on the operating state of the mobile robot 100, instead of receiving the notification from the mobile robot 100 indicating that the mobile robot 100 is placed in the recovery requiring state. In this case, the server device 300 determines that the mobile robot 100 is placed in the recovery requiring state when, for example, the mobile robot 100 stops in a predetermined emergency evacuation area or the mobile robot 100 that should be moving does not move for a predetermined period or longer.

Further, the control unit 180 may receive the information indicating that the any of the mobile robots 100 (that is, the mobile robots 100_1 to 100_n) provided in the facility 900 is placed in the recovery requiring state from the server device 300 via the communication unit 130, and cause the speaker 145 or the monitor 150, each of which is the notification device, to output the information. In this case, the speaker 145 or the monitor 150 outputs information related to the mobile robot 100 in the recovery requiring state in accordance with the instruction from the control unit 180. With this configuration, the related person of the facility 900 (for example, medical staff) can understand which mobile robot 100 is in the recovery requiring state, and can quickly start the recovery operation of the mobile robot in the recovery requiring state. As a result, the mobile robot in the recovery requiring state can be quickly recovered.

Here, the control unit 180 may receive the information indicating that the two or more of the mobile robots 100 (that is, the mobile robots 100_1 to 100_n) provided in the facility 900 are placed in the recovery requiring state, together with their recovery priorities, and cause the speaker 145 or the monitor 150 to output the information. In this case, the speaker 145 or the monitor 150 outputs information related to the two or more mobile robots 100 in the recovery requiring state, together with their recovery priorities, in accordance with the instruction from the control unit 180. With this configuration, the related person of the facility 900 (for example, medical staff) can understand which mobile robot 100 is in the recovery requiring state, and can further understand their recovery priorities. As a result, the related person of the facility 900 can preferentially start the recovery operation from the mobile robot 100 having the high recovery priority.

The storage unit 190 includes a non-volatile memory such as a flash memory or an SSD. The storage unit 190 stores a floor map of a facility to be used by the mobile robot 100 to move autonomously. The storage unit 190 is connected to the control unit 180, and outputs stored information to the control unit 180 in response to a request from the control unit 180.

As shown in FIG. 5, in the mobile robot 100, the +X-axis direction side in which the robot camera 161 is installed is defined as the front. That is, during normal movement, the +X-axis direction side is the traveling direction as shown by the arrow.

Various ideas can be adopted for how to define the front of the mobile robot 100. For example, the front of the mobile robot 100 can be defined based on how the sensor group 160 for recognizing the surrounding environment is disposed. Specifically, of the side surfaces of the housing unit 120 of the mobile robot 100, the side on which a sensor having high recognition ability is disposed or many sensors are disposed can be defined as the front side of the mobile robot 100. Defining the front of the mobile robot 100 as described above makes it possible for the mobile robot 100 to move while more accurately recognizing the surrounding environment. The mobile robot 100 according to the present embodiment also has the +X-axis direction side in which the robot camera 161 is disposed as the front.

Alternatively, the front can be defined based on how the monitor 150 is disposed. When the monitor 150 displays the face of the character or the like, the surrounding people naturally understand that the monitor 150 is the front of the mobile robot 100. Therefore, when the display surface side of the monitor 150 is defined as the front of the mobile robot 100, there is little discomfort to the surrounding people. In the mobile robot 100 according to the present embodiment, the display surface side of the monitor 150 is defined as the front.

Further, the front of the mobile robot 100 may be defined based on a housing shape of the housing unit 120. For example, when the projected shape of the housing unit 120 on the traveling surface is rectangular, it is better to have the short side as the front than the longitudinal side as the front such that the mobile robot 100 does not get in the way as a parson passes by while the mobile robot 100 is moving. That is, depending on the housing shape, there is a housing surface that is preferably set as the front when the mobile robot is moving normally. In the mobile robot 100 according to the present embodiment, the short side of the rectangular is defined as the front. As described above, in the mobile robot 100, the front is defined so as to match some ideas. However, which idea is used to define the front may be determined in consideration of the shape and role of the mobile robot.

Operations of Mobile Robot

Subsequently, the operations of the mobile robot 100 will be described. For example, the user turns on the power of the mobile robot 100. Then, the user inputs a desired task to the operation reception unit 140. The ID sensor 170 identifies the ID of the user when the power supply is turned on or when the operation reception unit 140 is operated as necessary.

As a desired task, in order to transport the article, the user operates the operation reception unit 140 to open the storage chamber door 121 and store the article in the storage chamber. Then, the operation reception unit 140 is operated to close the storage chamber door 121.

Next, the user inputs the destination of transport of the article from the operation reception unit 140. With this process, the control unit 180 of the mobile robot 100 searches for the route from a transport source to the transport destination using the floor map stored in the storage unit 190. Then, the mobile robot 100 transports the article along the route derived from the floor map while avoiding obstacles such as installed objects and people.

Here, when the mobile robot 100 is stopped due to a low battery level, a failure, or the like, the mobile robot 100 transmits the information that the mobile robot 100 is placed in the recovery requiring state and information for determining the recovery priority (the transported object, the position information, the purpose of movement, etc.) to the server device 300. As described above, the server device 300 may determine the recovery requiring state of the mobile robot 100.

With this configuration, the server device 300 notifies the information related to the mobile robot 100 in the recovery requiring state and its recovery priority via the speaker 600 or the monitor 700 (not shown) provided in the facility 900, or the speaker 145 or the monitor 150 provided in the mobile robot 100. With this configuration, the related person of the facility 900 (for example, medical staff) can understand which mobile robot 100 is in the recovery requiring state. Further, the related person of the facility 900 can preferentially start the recovery operation from the mobile robot 100 having the high recovery priority.

As described above, when the robot control system according to the present embodiment detects that two or more mobile robots among the mobile robots are in the recovery requiring state, the robot control system notifies that the two or more mobile robots are in the recovery requiring state, together with their priorities. The robot control system according to the present embodiment notifies that the mobile robots in the recovery requiring state are in the recovery requiring state, and also notifies the recovery priorities of the mobile robots in the recovery requiring state. Therefore, the related person of the facility, for example, can preferentially start the recovery operation from the mobile robot having a high recovery priority.

Further, according to the present disclosure, a part or all of the processes by the mobile robot 100 and the server device 300 can be realized by causing the CPU to execute a computer program.

The program described above includes a set of instructions (or software code) for causing the computer to perform one or more of the functions described in the embodiments when loaded into the computer. The program may be stored in a non-transitory computer-readable medium or a tangible storage medium. The example of the computer-readable medium or the tangible storage medium includes, but is not limited to, a random-access memory (RAM), a read-only memory (ROM), flash memory, an SSD or other memory technologies, compact disc (CD)-ROM, digital versatile disc (DVD), a Blu-ray (registered trademark) disc or other optical disc storages, a magnetic cassette, a magnetic tape, a magnetic disk storage or other magnetic storage devices. The program may be transmitted on a transitory computer-readable medium or a communication medium. The example of the transitory computer-readable medium or the communication medium includes, but is not limited to, an electrical, optical, acoustic, or other form of propagating signal.

The present disclosure is not limited to the above embodiment, and can be appropriately modified without departing from the spirit. For example, the robot control system, the robot control method, and the control program shown below are also included in the scope of the technical idea of the present embodiment.

Appendix 1

A robot control system includes: a plurality of mobile robots that moves autonomously in a facility; and a control device that controls the mobile robots. When the control device detects that two or more of the mobile robots are in the recovery requiring state, the control device notifies that the two or more mobile robots are in the recovery requiring state, together with priorities of the two or more mobile robots.

Appendix 2

In the robot control system according to Appendix 1, the control device determines a recovery priority of each of the two or more mobile robots based on at least any of a transported object, a purpose of movement, and a current position of each of the two or more mobile robots.

Appendix 3

The robot control system according to Appendix 1 or 2 further includes a communication unit provided in the facility. The control device notifies that each of the two or more mobile robots is in the recovery requiring state, together with a recovery priority of each of the two or more mobile robots, via the communication device.

Appendix 4

In the robot control system according to any one of Appendices 1 to 3, the control device notifies that each of the two or more mobile robots is in the recovery requiring state, together with a recovery priority of each of the two or more mobile robots, via a mobile terminal possessed by a related person of the facility.

Appendix 5

The robot control system according to any one of Appendices 1 to 4 further includes a plurality of notification devices, the notification devices being provided in the respective mobile robots. The control device notifies that each of the two or more mobile robots is in the recovery requiring state, together with a recovery priority of each of the two or more mobile robots, via the communication device provided in each of the two or more mobile robots.

Appendix 6

The robot control system according to any one of Appendices 1 to 4 further includes a plurality of notification devices, the notification devices being provided in the respective mobile robots. The control device notifies that the mobile robot having a highest recovery priority, from the two or more mobile robots, is in the recovery requiring state via the communication device provided in the mobile robot having the highest recovery priority.

Appendix 7

In the robot control system according to Appendix 6, the control device notifies that the mobile robot having a second highest recovery priority, from the two or more mobile robots, is in the recovery requiring state via the communication device provided in the mobile robot having the highest recovery priority.

Appendix 8

In the robot control system according to any one of Appendices 1 to 7, the control device further notifies at least any of a transported object, a purpose of movement, and a current position of each of the two or more mobile robots.

Appendix 9

A robot control method comprising: a step of detecting an operating state of each of a plurality of mobile robots that moves autonomously in a facility; and a step of notifying that, when two or more of the mobile robots are detected to be in a recovery requiring state, the two or more mobile robots are in the recovery requiring state, together with priorities of the two or more mobile robots.

Appendix 10

The robot control method according to Appendix 9 further includes a step of determining a recovery priority of each of the two or more mobile robots based on at least any of a transported object, a purpose of movement, and a current position of each of the two or more mobile robots before the step of notifying.

Appendix 11

In the robot control method according to Appendix 9 or 10, in the step of notifying, a notification is made that each of the two or more mobile robots is in the recovery requiring state, together with a recovery priority of each of the two or more mobile robots, via a communication device provided in the facility.

Appendix 12

In the robot control method according to any one of Appendices 9 to 11, in the step of notifying, a notification is made that each of the two or more mobile robots is in the recovery requiring state, together with a recovery priority of each of the two or more mobile robots, via a mobile terminal possessed by a related person of the facility.

Appendix 13

In the robot control method according to any one of Appendices 9 to 12, in the step of notifying, a notification is made that each of the two or more mobile robots is in the recovery requiring state, together with a recovery priority of each of the two or more mobile robots, via a communication device provided in each of the two or more mobile robots.

Appendix 14

In the robot control method according to any one of Appendices 9 to 12, in the step of notifying, a notification is made that the mobile robot having a highest recovery priority, from the two or more mobile robots, is in the recovery requiring state via a communication device provided in the mobile robot having the highest recovery priority.

Appendix 15

In the robot control method according to Appendix 14, in the step of notifying, a notification is made that the mobile robot having a second highest recovery priority, from the two or more mobile robots, is in the recovery requiring state via the communication device provided in the mobile robot having the highest recovery priority.

Appendix 16

In the robot control method according to any one of Appendices 9 to 15, in the step of notifying, at least any of a transported object, a purpose of movement, and a current position of each of the two or more mobile robot is further notified.

Appendix 17

A control program causes a computer to execute: a process of detecting an operating state of each of a plurality of mobile robots that moves autonomously in a facility; and a process of notifying that, when two or more of the mobile robots are detected to be in a recovery requiring state, the two or more mobile robots are in the recovery requiring state, together with priorities of the two or more mobile robots.

Appendix 18

The control program according to Appendix 17 further causes a computer to execute a process of determining a recovery priority of each of the two or more mobile robots based on at least any of a transported object, a purpose of movement, and a current position of each of the two or more mobile robots before the process of notifying.

Appendix 19

In the control program according to Appendix 17 or 18, in the process of notifying, a notification is made that each of the two or more mobile robots is in the recovery requiring state, together with a recovery priority of each of the two or more mobile robots, via a communication device provided in the facility.

Appendix 20

In the control program according to any one of Appendices 17 to 19, in the process of notifying, a notification is made that each of the two or more mobile robots is in the recovery requiring state, together with a recovery priority of each of the two or more mobile robots, via a mobile terminal possessed by a related person of the facility.

Appendix 21

In the control program according to any one of Appendices 17 to 20, in the process of notifying, a notification is made that each of the two or more mobile robots is in the recovery requiring state, together with a recovery priority of each of the two or more mobile robots, via a communication device provided in each of the two or more mobile robots.

Appendix 22

In the control program according to any one of Appendices 17 to 20, in the process of notifying, a notification is made that the mobile robot having a highest recovery priority, from the two or more mobile robots, is in the recovery requiring state via a communication device provided in the mobile robot having the highest recovery priority.

Appendix 23

In the control program according to Appendix 22, in the process of notifying, a notification is made that the mobile robot having a second highest recovery priority, from the two or more mobile robots, is in the recovery requiring state via the communication device provided in the mobile robot having the highest recovery priority.

Appendix 24

In the control program according to any one of Appendices 17 to 23, in the process of notifying, at least any of a transported object, a purpose of movement, and a current position of each of the two or more mobile robot is further notified.

What is claimed is:

1. A robot control system comprising:
    a control device that includes a central processing unit, the central processing unit being configured to control a plurality of mobile robots by wireless communication, wherein
    the plurality of mobile robots autonomously moves in a facility, and
    the control device is configured to:
    detect that two or more mobile robots from the plurality of mobile robots have malfunctioned or are stopped, and are in a recovery requiring state,
    based upon the detection that the two or more mobile robots are in the recovery requiring state, determine a recovery priority for each of the two or more mobile robots, a first mobile robot from the two or more mobile robots having the highest recovery priority among the two or more mobile robots, a second mobile robot from the two or more mobile robots having the second highest recovery priority from the two or more mobile robots, and
    while the two or more mobile robots are in the recovery requiring state, send a signal to the first mobile robot that causes the first mobile robot to provide a notification via at least one of a speaker or a monitor mounted on the first mobile robot, and
    after a recovery operation of the first mobile robot is performed and the first mobile robot is recovered and no longer in the recovery requiring state, send a signal to the second mobile robot that causes the second mobile robot to provide a notification via at least one of a speaker or a monitor mounted on the second mobile robot, so that the notification by the first mobile robot and the notification by the second mobile robot are provided at different times from each other based on the recovery priority.

2. The robot control system according to claim 1, wherein the control device determines the recovery priority of each of the two or more mobile robots based on at least any of a transported object, a purpose of movement, or a current position of each of the two or more mobile robots.

3. The robot control system according to claim 1, wherein the control device is configured to provide a notification that each of the two or more mobile robots is in the recovery requiring state, together with the recovery priority of each of the two or more mobile robots, via a communication device provided in the facility.

4. The robot control system according to claim 1, wherein the control device is configured to provide a notification that each of the two or more mobile robots is in the recovery requiring state, together with the recovery priority of each of the two or more mobile robots, via a mobile terminal possessed by a related person of the facility.

5. The robot control system according to claim 1, wherein the control device is configured to provide the signal to the first mobile robot via a communication device provided in the first mobile robot.

6. The robot control system according to claim 5, wherein the control device is configured to provide the signal to the second mobile robot via the communication device provided in the second mobile robot.

7. The robot control system according to claim 1, wherein the notification includes information indicating at least any of a transported object, a purpose of movement, or a current position of each of the two or more mobile robots.

8. The robot control system according to claim 1, further comprising
    the plurality of mobile robots that moves autonomously in the facility.

9. A robot control method comprising:
    detecting an operating state of each of a plurality of mobile robots that moves autonomously in a facility by wireless communication;
    detecting that two or more mobile robots from the plurality of mobile robots have malfunctioned or are stopped, and are in a recovery requiring state;
    based upon the detection that the two or more mobile robots are in the recovery requiring state, determining a recovery priority for each of the two or more mobile robots, a first mobile robot from the two or more mobile robots having the highest recovery priority among the two or more mobile robots, a second mobile robot from the two or more mobile robots having the second highest recovery priority from the two or more mobile robots; and
    while the two or more mobile robots are in the recovery requiring state, sending a signal to the first mobile robot that causes the first mobile robot to provide a notification via at least one of a speaker or a monitor mounted on the first mobile robot, and
    after a recovery operation of the first mobile robot is performed and the first mobile robot is recovered and no longer in the recovery requiring state, sending a signal to the second mobile robot that causes the second mobile robot to provide a notification via at least one of a speaker or a monitor mounted on the second mobile robot, so that the notification by the first mobile robot and the notification by the second mobile robot are provided at different times from each other based on the recovery priority.

10. A non-transitory computer-readable medium storing a code that causes a computer to execute:
    a process of detecting an operating state of each of a plurality of mobile robots that moves autonomously in a facility by wireless communication;
    a process of detecting that two or more mobile robots from the plurality of mobile robots have malfunctioned or are stopped, and are in a recovery requiring state;
    based upon the detection that the two or more mobile robots are in the recovery requiring state, a process of determining a recovery priority for each of the two or more mobile robots, a first mobile robot from the two or more mobile robots having the highest recovery priority among the two or more mobile robots, a second mobile robot from the two or more mobile robots having the second highest recovery priority from the two or more mobile robots, and while the two or more mobile robots are in the recovery requiring state, a process of sending a signal to the first mobile robot that causes the first mobile robot to provide a notification via at least one of a speaker or a monitor mounted on the first mobile robot, and after a recovery operation of the first mobile robot is performed and the first mobile robot is recovered and no longer in the recovery requiring state, a process of sending a signal to the second mobile robot that causes the second mobile robot to provide a notification via at least one of a speaker or a monitor mounted on the second mobile robot, so that the notification by the first mobile robot and the notification by the second mobile robot are provided at different times from each other based on the recovery priority.

* * * * *